United States Patent [19]
Ovalles et al.

[11] Patent Number: 6,017,845
[45] Date of Patent: Jan. 25, 2000

[54] MICROWAVE HEATED CATALYST AND PROCESS

[75] Inventors: Cesar Ovalles, Edo Miranda; Alfredo Morales, Caracas; Luis A. Rivas, Edo Miranda; Nora Urbano, Caracas, all of Venezuela

[73] Assignee: Intevep, S.A., Caracas, Venezuela

[21] Appl. No.: 09/115,052

[22] Filed: Jul. 14, 1998

[51] Int. Cl.[7] ............................. B01J 27/02; B01J 27/04; B01J 27/043; B01J 27/047; B01J 27/051
[52] U.S. Cl. .................. 502/216; 502/219; 502/220; 502/221; 502/222; 502/223
[58] Field of Search .................... 502/216, 219, 502/220, 221, 222, 223

[56] References Cited

U.S. PATENT DOCUMENTS

| | | | |
|---|---|---|---|
| 3,619,414 | 11/1971 | Mills et al. | 208/143 |
| 4,081,404 | 3/1978 | Wilms et al. | 502/220 |
| 4,111,796 | 9/1978 | Yanik et al. | 208/216 |

*Primary Examiner*—Elizabeth D. Wood
*Attorney, Agent, or Firm*—Bachman & LaPointe, P.C.

[57] ABSTRACT

A process comprises providing a catalyst comprising a support, a microwave absorption material, and a catalytically active phase; heating the catalyst with a source of microwave energy which is absorbed by said microwave absorption material to increase the temperature of the catalyst to a desired temperature; and contacting said heated catalyst with a hydrocarbon feedstock for upgrading same.

18 Claims, No Drawings

MICROWAVE HEATED CATALYST AND PROCESS

BACKGROUND OF THE INVENTION

The present invention relates to an improved catalyst support and catalyst and, more particularly, a catalyst support and catalyst for use in a process for upgrading hydrocarbon feedstocks.

The prior art is replete with catalysts for use in processes for upgrading hydrocarbons to higher value products. Most of the aforesaid processes are carried out at elevated temperatures under controlled conditions. The processes tend to be expensive as a result of the high energy input required to carry out the processes at elevated temperatures and pressures. Catalysts are employed in the processes for various reasons, including, but not limited to, reducing the temperatures and pressures at which the hydrocarbon conversion reaction takes place.

Naturally, it would be highly desirable to provide improved catalyst supports and catalysts for use in hydrocarbon conversion processes which would allow for the hydrocarbon conversion to take place at significantly lower temperatures and pressures than heretofore attainable.

Accordingly, it is the principle object of the present invention to provide an improved catalyst support and catalyst for use in hydrocarbon conversion processes for the conversion of hydrocarbons to products of higher value.

It is a further object of the present invention to provide a process, catalyst and catalyst support which allows for the hydrocarbon conversion processes to be carried out under more favorable conditions of temperature and pressure.

It is another object of the present invention to provide a catalyst and catalyst support which is useful in combination with microwave energy to convert hydrocarbon feeds to higher quality products.

Further objects and advantages of the present invention will appear hereinbelow.

SUMMARY OF THE INVENTION

In accordance with the present invention, the foregoing objects and advantages are readily obtained.

The process of the present invention comprises providing a catalyst comprising a support, a microwave absorption material, and a catalytically active phase; heating the catalyst with a source of microwave energy which is absorbed by said microwave absorption material to increase the temperature of the catalyst to a desired temperature; and contacting said heated catalyst with a hydrocarbon feedstock for upgrading same.

In further accordance with the present invention, the catalyst includes a microwave absorption material characterized by a dielectric loss factor of greater than or equal to $1 \times 10^{-2}$, preferably, $1 \times 10^{-1}$. The dielectric loss factor is defined as tan δ and is equal to e"/e' in which e" is the dielectric loss constant and is associated with the ability of the material to transform microwave into heat and, e' is the dielectric constant associated with ability of the material to be polarized in an electric field. More information about this subject can be found in MINDOS, D. M.; BAGHURST, D. R., Chem. Soc. Rev., 20, 1 (1991) and references cited herein. In accordance with the present invention, the microwave absorption material may be incorporated into the catalyst support, formed as a single compound with the catalytically active phase, and/or included as a separate element in the final catalyst product. In accordance with the preferred embodiment of the present invention, the catalytically active phase is selected from the group consisting of transition metal sulfides and is deposited on a support material which is, preferably, an inorganic oxide material.

DETAILED DESCRIPTION

The present invention relates to an improved catalyst and a process for upgrading hydrocarbon feedstocks employing the catalyst. The catalyst of the present invention comprises a support, a microwave absorption material, and a catalytically active phase. In accordance with the present invention, the catalyst support is formed of an inorganic oxide material selected from the group consisting of alumina, silica, zirconium oxide, magnesium oxide, titanium oxide and mixtures thereof. The microwave absorption material in the final catalyst product is selected from the group consisting of compounds of Si, Fe, Ni, Cr, S and mixtures thereof. Particularly suitable microwave absorption materials include SiC, $MoS_2$, NiS, CoS, FeS, iron oxide, nickel oxide, chromium oxide and mixtures thereof.

In order to carry out a hydrocarbon conversion process, the catalyst of the present invention includes a catalytically active phase. In accordance with the present invention, it is preferred that the catalytically active phase is selected from the group consisting of transition metal sulfides and mixtures thereof. In accordance with the preferred embodiment of the present invention, the catalytically active phase and microwave absorption material may be formed in a single compound. It is a critical feature of the present invention that the microwave absorption material is characterized by a dielectric loss factor of greater than or equal to $1 \times 10^{-2}$, preferably, $1 \times 10^{-1}$. Accordingly, if the microwave absorption material and catalytically active phase are formed in a single compound, the compound must have a dielectric loss factor greater than or equal to $1 \times 10^{-2}$, preferably, $1 \times 10^{-1}$. Suitable compounds for use in the catalyst of the present invention consist of $MoS_2$, NiS, CoS, FeS, and mixtures thereof.

In accordance with the present invention, the composition of the catalyst is as follows: the support is present in the amount of between about 10 to 95 wt %, the microwave absorption material is present in an amount of between about 1 to 80 wt %, and the catalytically active phase is present in an amount of between about 1 to 50 wt %, all with respect to the total weight of the final catalyst. Preferably, the support is present in an amount between about 70 to 90 wt %, the microwave absorption material is present in an amount of between about 1 to 60 wt %, and the catalytically active phase is present in an amount of between about 1 to 20 wt %. It is preferred that the catalytically active phase be deposited directly on the support.

It is preferred that the catalyst be formed of grains having a grain size of less than or equal to 1.7 mm and preferably between 1.0 to 1.7 mm.

As noted above, the catalyst support may include the inorganic oxide material and the microwave absorption material wherein the ratio of the inorganic oxide material to the microwave absorption material in the support is between about 80:20 to 20:80. The catalytically active phase may then be deposited on the support structure so as to form the final catalyst product. Alternatively, the catalyst support may consist of only the inorganic oxide material and the microwave absorption material and catalytically active material may be deposited on the support as is known in the prior art. Furthermore, as noted above, the catalytically active phase and microwave absorption material may be in the form of a single compound which is deposited on the catalyst support.

The catalyst of the present invention allows for a process for upgrading hydrocarbon feedstocks which is efficient and economical. By providing a catalyst which includes therein a microwave absorption material, microwave energy can be provided to preferentially heat the catalyst to a temperature which allows for the hydrocarbon conversion process to take place without requiring the energy input necessary to heat an entire reactor to the requisite temperature as done in conventional processes. The process of the present invention comprises the following steps: providing a catalyst comprising a support, a microwave absorption material, and a catalytically active phase; heating the catalyst with the source of microwave energy so as to increase the temperature of the catalyst to a desired reaction temperature; and contacting a hydrocarbon feedstock with the heated catalyst for upgrading the hydrocarbon feedstock. In accordance with the process of the present invention, the catalyst is heated to a temperature of less than or equal to 350° C. This is accomplished by providing microwave energy in the range of between about 1 Mhz to 10,000 Mhz. Preferably between about 800 Mhz to 3,000 Mhz. The process is carried out at pressures of less than or equal to 200 psi. By employing the catalyst in accordance with the present invention, effective conversion of the hydrocarbon feedstock takes place under lower pressure and temperature conditions used in conventional processes.

The effectiveness of the process of the present invention employing the catalyst of the present invention will be demonstrated by the following examples.

EXAMPLE 1

The catalyst samples M-1 through M-5 prepared by a coimpregnation method, with a metal contents (catalytically active phase) of 8.8% Mo, 4.4% P and 2.2% Ni, using a $Al_2O_3/SiC$ support (balance by wt.%) with different ratios $Al_2O_3/SiC$ and a grain size of 1–1.7 mm, were tested for the hydrodesulfurization (HDS) and hydroconversion of vacuum gas oil (VGO) which contained 2.27% of sulfur (w/w) and 48% of the >500° C. distillates. In a typical experiment, 35 g of feed were mixed with 7 g of each catalyst to obtain a VGO/Catalyst ratio of 5. The samples were placed in a batch glass reactor and heated with a microwave oven (630 Watts and 2450 MHz) without stirring at 140 psi of pressure of hydrogen introduced at a flow rate of 47 cc/min. The time of radiation exposure was 110 min. for each catalyst and the total reaction time (includes the cycles on and off of the radiation) was 180 min. The sulfur content and conversion of the >500° C. distillates were determined after the test. The results are shown in Table 1.

TABLE 1

Effect of the $Al_2O_3/SiC$ ratio of the inorganic oxide material to microwave absorption material on the HDS and >500° C. distillates conversion for experiences done with the VGO (2.27% of sulfur (w/w) and 48% of the > 500° C.).

| Catalyst ($Al_2O_3/SiC$) | T (° C.) (±3° C.) | % HDS | % Conversion Fraction >500° C. |
|---|---|---|---|
| M-1 (1/1) | 354 | 25 | 50 |
| M-2 (2/1) | 357 | 52 | 42 |
| M-3 (3/1) | 355 | 64 | 39 |
| M-4 (4/1) | 354 | 45 | 28 |

TABLE 1-continued

Effect of the $Al_2O_3/SiC$ ratio of the inorganic oxide material to microwave absorption material on the HDS and >500° C. distillates conversion for experiences done with the VGO (2.27% of sulfur (w/w) and 48% of the > 500° C.).

| Catalyst ($Al_2O_3/SiC$) | T (° C.) (±3° C.) | % HDS | % Conversion Fraction >500° C. |
|---|---|---|---|
| M-5 (5/1) | 354 | 38 | 24 |

This example demonstrates the existence of an optimum in the $Al_2O_3/SiC$ ratio of the support for the catalyst of the present invention to obtain a maximum sulfur removal (%HDS=64%).

EXAMPLE 2

Different compounds based on Mo and Ni as oxide or sulfide and supported over alumina or alumina+SiC or alumina+$Fe_2O_3$, which have different dielectric loss factor (tan δ), were tested for the hydrodesulfurization (HDS) and hydroconversion of vacuum gas oil (VGO) which contained 2.27% of sulfur (w/w) and 48% of the >500° C. distillates at the same operation conditions described in Example 1. The results are shown in Table 2.

TABLE 2

| Experience | Material | T(° C.) | tan δ[1] 2467 MHz 350° C. | % HDS[2] | % Conv. Fraction >500° C. |
|---|---|---|---|---|---|
| 1 | $MoS_2$ + $NiS/Al_2O_3$ | 355 ± 3 | no determ. | 42 | 15 |
| 2 | $MoO_2$ + $NiO/Al_2O_3$ | 200 ± 3 | 0.031 | 4 | 0 |
| 3 | $MoS_2$ + $NiS/Al_2O_3$—SiC | 355 ± 3 | >0.20 | 64 | 39 |
| 4 | $Al_2O_3$—SiC | 352 ± 3 | 0.20 | 3 | 0 |
| 5 | $MoS_2$ + $NiS/Fe_2O_3$—$Al_2O_3$ | 350 ± 4 | no determ. | 21 | 15 |

These examples demonstrate that when the Mo and Ni are on the oxide form (Experience 2) the tan δ is lower than when they are in the sulfide form (Experience 1) and the temperature reached in the first case is lower and also is the HDS obtained. Also it is demonstrated that when the active phase is not present ($MoS_2$+NiS) (Experiences 2 and 4) the catalyst is not active for the HDS reaction and >500° C. fraction conversion. These examples also demonstrate that the $MoS_2$+NiS/$Fe_2O_3$—$Al_2O_3$ catalyst is also active for the HDS of a vacuum gas oil with microwave heating as well as for the >500° C. fraction conversion.

EXAMPLE 3

The effectiveness of the catalyst of the present invention with a $Al_2O_3/SiC$ ratio of 3/1 in the microwave heated process was compared with a conventionally thermal process for the hydrodesulfurization (HDS) and hydroconversion of three different feeds: a vacuum gas oil (VGO) which contained 0.67% of sulfur (w/w) and 10% of the >500° C. distillates (named PLC), another vacuum gas oil (VGO) which contained 2.27% of sulfur (w/w) and 48% of the >500° C. distillates (named AMUAY) and a residual with 3.90% of sulfur (w/w) and 71% of the >500° C. distillates (named Morichal). All the experiences were carried out under the same conditions as Example 1. The results are shown in Table 3.

TABLE 3

| Feed | Source of heating | T(° C.) (±3) | % HDS[2] | % Conversion 350–500° C. |
|---|---|---|---|---|
| GOV PLC | MW | 350 | 80 | 0 |
| GOV PLC | Thermally | 350 | 73 | 0 |
| GOV AMUAY | MW | 350 | 64 | 39 |
| GOV AMUAY | Thermally | 350 | 51 | 0 |
| Residue Morichal | MW | 350 | 30 | 44 |
| Residue Morichal | Thermally | 350 | 24 | 27 |

This example demonstrates that the process of the present invention presents better results for the hydrodesulfurization and for the conversion of the >500° C. fraction than those found for the conventional thermal process.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A catalyst comprising:
   a support comprising an inorganic oxide material;
   a microwave absorption material selected from the group consisting of SiC, iron oxide and mixtures thereof; and
   a catalytically active phase selected from the group consisting of transition metal sulfides and mixtures thereof.

2. A catalyst according to claim 1 wherein the microwave absorption material is incorporated in the support.

3. A catalyst according to claim 2 wherein the microwave absorption material is characterized by a dielectric loss factor of greater than or equal to ($\geq$) $1 \times 10^{-2}$.

4. A catalyst according to claim 1 wherein the inorganic oxide material is selected from the group consisting of alumina, silica, zirconium oxide, magnesium oxide, titanium oxide and mixtures thereof.

5. A catalyst according to claim 1 wherein the catalytically active phase is selected from the group consisting of $MoS_2$, NiS and mixtures thereof.

6. A catalyst according to claim 1 wherein the support is present in an amount between about 10 to 95 wt %, the microwave absorption material is present in an amount of between about 1 to 80 wt %, and the catalytically active phase is present in an amount of between about 1 to 50 wt %, all with respect to the total weight of the catalyst.

7. A catalyst according to claim 1 wherein the support is present in an amount between about 70 to 90 wt %, the microwave absorption material is present in an amount of between about 1 to 60 wt %, and the catalytically active phase is present in an amount of between about 1 to 20 wt %, all with respect to the total weight of the catalyst.

8. A catalyst according to claim 1 wherein the catalytically active phase is deposited on the support.

9. A catalyst according to claim 8 wherein the catalyst is formed of grains having a grain size of between about 1.0 to 1.7 mm.

10. A catalyst according to claim 8 wherein the catalyst is formed of grains having a grain size of less than or equal to ($\leq$) 1.7 mm.

11. A catalyst according to claim 1 wherein the ratio of support to absorption material is between about 2:1 to about 4:1.

12. A process for preparing a catalyst comprising:
    preparing a support comprising an inorganic oxide material and a microwave absorption material selected from the group consisting of SiC, iron oxide and mixtures thereof; and
    depositing on the support a catalytically active phase selected from the group consisting of transition metal sulfides and mixtures thereof.

13. A process according to claim 12 wherein the ratio of inorganic oxide material to microwave absorption material in the support is between about 99:1 to 20:80.

14. A process according to claim 12 wherein the ratio of inorganic oxide material to microwave absorption material in the support is between about 80:20 to 20:80.

15. A process according to claim 13 including the step of forming catalyst particles having a grain size of less than or equal to ($\leq$) 1.7 mm.

16. A process according to claim 15 wherein the grain size is between about 1.0 to 1.7 mm.

17. A process according to claim 15 wherein the microwave absorption material is characterized by a dielectric loss factor of greater than or equal to ($\geq$) $1 \times 10^{-2}$.

18. A process according to claim 12 wherein the catalytically active phase is selected from the group consisting of $MoS_2$, NiS and mixtures thereof.

* * * * *